United States Patent [19]

Perelle et al.

[11] 3,898,548

[45] Aug. 5, 1975

[54] ELECTRICITY METER FOR ACCUMULATOR BATTERIES

[75] Inventors: Michel Perelle, Versailles; Paul Schott, Chaville, both of France

[73] Assignee: Les Redresseurs Statiques Industriels P. Benit & cie, Chaville, Hauts de Seine, France

[22] Filed: Dec. 5, 1973

[21] Appl. No.: 421,754

[30] Foreign Application Priority Data

Dec. 6, 1972 France .............................. 72.43392

[52] U.S. Cl. ............... 320/48; 235/150.51; 320/44; 324/29.5; 324/76
[51] Int. Cl. ......................................... H01m 45/06
[58] Field of Search .................... 320/39, 40, 43–45, 320/48; 307/125; 324/29.5, 76 A; 235/150.51

[56] References Cited
UNITED STATES PATENTS

| | | | |
|---|---|---|---|
| 3,484,681 | 12/1969 | Grady, Jr. et al. .............. | 320/44 UX |
| 3,593,099 | 7/1971 | Scholl ............................... | 320/48 X |
| 3,727,074 | 4/1973 | Keller et al. ....................... | 320/43 X |
| 3,735,234 | 5/1973 | Godard ................................ | 320/44 |

OTHER PUBLICATIONS
GE Transistor Manual, 7th Ed., pp. 122, 123.

Moreton, "Fuel Gage for the Electric Car" Proc. IEE, Vol. 119, No. 6, June 1972, pp. 649–654.

*Primary Examiner*—J. D. Miller
*Assistant Examiner*—Robert J. Hickey
*Attorney, Agent, or Firm*—Charles E. Baxley

[57] ABSTRACT

The present invention relates to an electricity meter, especially for an accumulator battery, operative in a forward direction (adding) or in the reverse direction (deducting) corresponding to the discharging and charging phases of the battery. The meter comprises an amplification circuit, an impulse generator having a frequency proportional to the intensity of the discharge or charging current passing through a shunt, and a device for counting and indicating the impulses. The meter further includes threshold devices and logic units permitting the counting of the impulses in a first direction only when the discharge current has an absolute value greater than a first pre-determined threshold value, and permitting the counting of the the impulses in the opposite direction only when the charging current has an absolute value greater than a second pre-determined threshold value.

3 Claims, 4 Drawing Figures

ELECTRICITY METER FOR ACCUMULATOR BATTERIES

The present invention belongs to the field of electricity quantity-meters or ampere-hour meters. It relates more particularly to an electricity quantity meter for the current delivered by an accumulator battery during discharge or received by the battery during charging. It finds its main application in the utilization of industrial accumulator batteries mounted on trolleys or trucks for example.

For the rational and economic utilization of industrial batteries, it is necessary to know with high accuracy during the course of the use following a charging of a battery, the total amount of charging current delivered to the battery. When, starting from the condition of full charge of the battery, this amount reaches a pre-determined value fixed by the manufacturer, the battery must be put back on charge. On the other hand, during the charging process, it is also useful to know the quantity of electricity stored in the battery.

The first condition required from an ampere-hour meter working under these conditions is therefore reversibility: the meter must count forward for a first direction of the current and must deduct for the opposite direction, for example count the quantity of electricity conveyed by the discharge current, and deduct the quantity of electricity conveyed by the charging current.

However, if it is desired to draw from the indications of the meter a reliable evaluation of the state of charge of the battery, it must be taken into account that the charging ampere-hours do not have the same "weight" in the general economy of the battery as the discharge ampere-hours.

It is in fact well known that when the charging of a battery is continued to its rated capacity, the charging current usually produces an electrolysis process at the end of the charge. The ampere-hours consumed during this electrolysis phase do not appear in the net charge of the battery and cannot be supplied during the use of the battery. The efficiency in discharge/charge ampere-hours of a battery is lower than unity and is of the order of 70 to 80%.

If it is desired to draw-up a true balance sheet of the state of charge and discharge of the battery, only comparable quantities can be compared. It is therefore necessary to modify systematically the rate of counting between the charge and discharge of reducing the charging ampere-hours with respect to the discharge ampere-hours. In this way, if the battery has a capacity of Q ampere-hours, when the meter indicates a value Q, the user knows that it is discharged. After it has been put on charge, when the meter has returned to zero, the user knows that it is fully charged.

Electricity meters which approximately carry out such a program of operation are already known. However, they do not comply with the conditions of accuracy and stability which the user is entitled to expect from such an instrument.

The electricity meter of the present invention automatically ensures operation in the counting or deducting direction, depending on whether the battery is on discharge or on charge, and is provided with a simple and reliable means for differently weighting the charging and discharging ampere-hours as a function of the efficiency of the battery.

On the other hand, it has been found that the excitation of the meter, supplied in the form of short impulses or logical signals, the repetition frequency of which is proportional to the intensity of the charging or discharge current passing through a shunt, should be blocked when the absolute value of the current passing into the shunt is less than a pre-determined threshold value. It has in fact appeared that in the absence of any regular charging or discharge current, the shunt may be traversed by very small leakage currents giving rise to stray impulses which, being brought into account, alter the position of the meter in the times of complete rest. The differences thus observed are small and do not result in substantial errors in the power balance sheet, but they create however in the user's mind a suspicion of the reliability of the meter. It is therefore much more preferable to eliminate them, which furthermore does not create any disturbanc, since such currents, less for example than 1% of the normal output, would never be encountered in the utilization of the battery. There is also another important aspect of the present invention whereby provides an industrially advantageous solution to the problem of meter cut-off. In principle, the charge is completed when the meter, which operates by deducting during this process, reaches the zero reading. It is however possible that the charge is not interrupted exactly at the moment when the meter reaches zero during the course of the deduction period. If it is allowed to continue working, it indicates values which are entirely unreliable from the point of view of accounting for the quantities of electricity. During the charging period, it is essential to cut-off the excitation of the meter when it reaches the value zero.

The metering and indicating device may take various forms, for example, an electronic meter with light indication, an electro-magnetic meter with a motor driving wheels with numbers, etc.

In its general aspect, the meter of the present invention essentially comprises an impulse generator supplying calibrated impulses or logical signals, having a frequency proportional to the current passing through a shunt associated with the battery, irrespective of the direction of this current, and a logic device which transmits, for each impulse generated, a forward signal to a metering device when the battery is discharging into the utilization device and transmits a reversing signal when the battery is on charge and vice-versa. The transmission of these signals only takes place if the intensity of the current passing through the shunt exceeds a certain pre-determined threshold value, in absolute terms value, while on the other hand the transmission of the reversing signals in the case of charging is blocked when the meter has reached the indication zero.

The invention will now be described in detail in the form of an example of construction, reference being made to the accompanying drawings, in which:

FIG. 3b is a set of voltage curves which facilitate the understanding of the operation of the circuitry of FIG. 3a.

Figure 1:
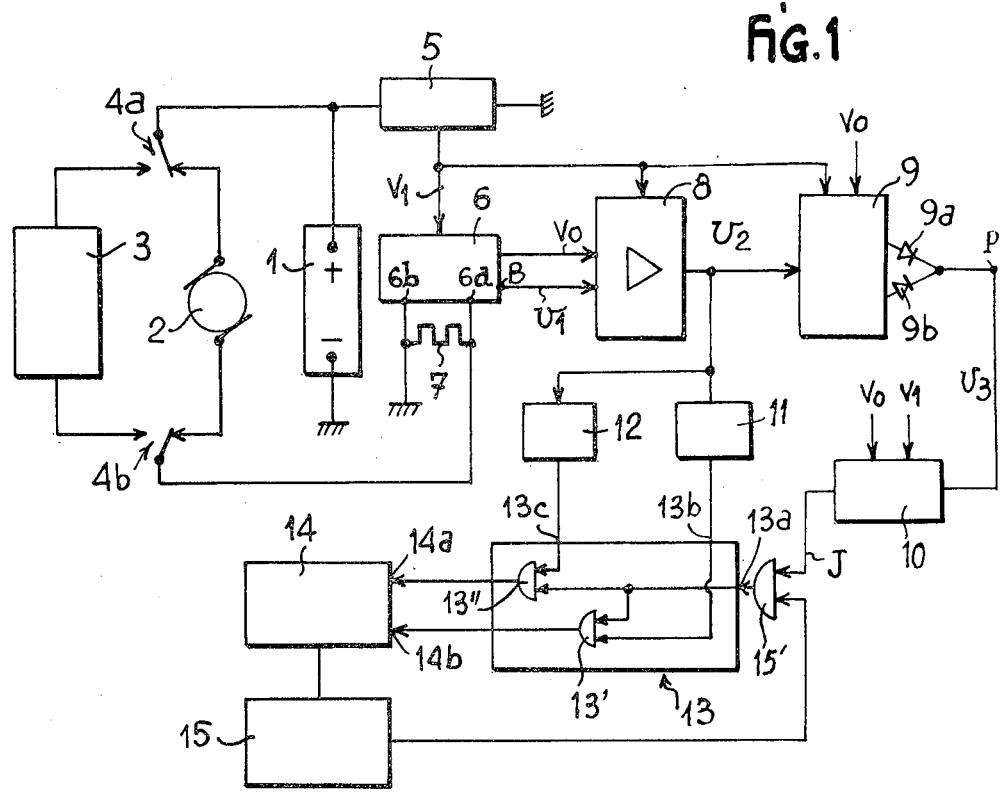
FIG. 1 is a general schematic diagram of the one embodiment of meter according to the present invention.

In FIG. 1, a battery 1 has its negative pole connected, for example, to ground and its positive pole connected to a stabilized voltage supply 5 which supplies a stabilized voltage V1. The positive pole of the battery is also connected to the common point of a reversing switch 5 which can connect it either to a terminal of a utilization device 2, for example a direct current motor, or to a terminal of a rectifier 3.

An input circuit 6 with resistances, supplied with the voltage V1, is connected to a shunt 7 between a terminal 6a and a terminal 6b which is connected to earth. The terminal 6a is connected to the common point of a change-over switch 4b, conjointly operated with the switch 4a which may be connected either to a second terminal of the motor 2 or to a second terminal of the rectifier 3. The input circuit 6 supplies a stabilized reference voltage V0 which has an absolutely constant ratio with respect to the stabilized voltage after V1.

An amplification stage 8, preferably of the operational type, supplied with the voltage V1, receives on two inputs respectively the reference voltage V0 and the voltage U1 from a terminal B of the circuit 6. It supplies at its output an amplified voltage signal U2.

The voltage U2 is intended to excite an impulse generator 10 for generating impulses or logical signals having a frequency proportional to the voltage U2 and therefore to the current in the shunt 7. As the excitation voltage of the impulse generator 10 must have a constant polarity, irrespective of the direction of the current in the shunt 7, the voltage U2 is not applied to it directly but through the intermediary of an amplifier and rectifier stage 9, supplied by the voltage V1 and provided at its output with two diodes 9a, 9b having a common point P, which applies a voltage U3 of constant polarity to the input of the impulse generator 10.

The output impulses J from the generator 10 are applied to an input 13a of a logic unit 13 which also receives control signals from two threshold devices 11 and 12 on the inputs 13b and 13c respectively. The two threshold devices, supplied by the voltage V1, receive the reference voltage V0 and the voltage U2 as the input magnitude.

The threshold 11 compares the voltage U2 with a voltage slightly higher than V0, namely V0 +e (case of discharge), whereas the threshold 12 compares the voltage U2 with a voltage slightly lower than V0, namely V0 −e (case of charging). The threshold device 11 gives a transmission order or command signal for the impulses to a metering and indicating device 14 via input 14a, in the counting direction, for a discharge current giving a voltage U2 higher than V0 + e. The threshold device 12 gives a transmission order or command signal for the impulses to the metering and indicating device 14 via input 14b, in the deducting direction, input for a charging current giving a voltage lower than V0 − e. For a voltage U2 having a value between V0 + e and V0 − e, no command signal is transmitted to the metering and indicating device 14.

When during the charging the device 14 indicates the value zero, this condition is decoded by a decoding device 15 which then applies an inhibiting signal to a gate 15' which prevents the impulses J from reaching the logic device 13 (in the charging direction only).

In the case where the metering and indicating device 14 is an electronic impulse counter with two inputs, 14a for the adding direction, 14b for the deducting direction, the logic unit 13 is simply constituted by two AND gates 13' and 13'', as shown in FIG. 1.

Figure 2:
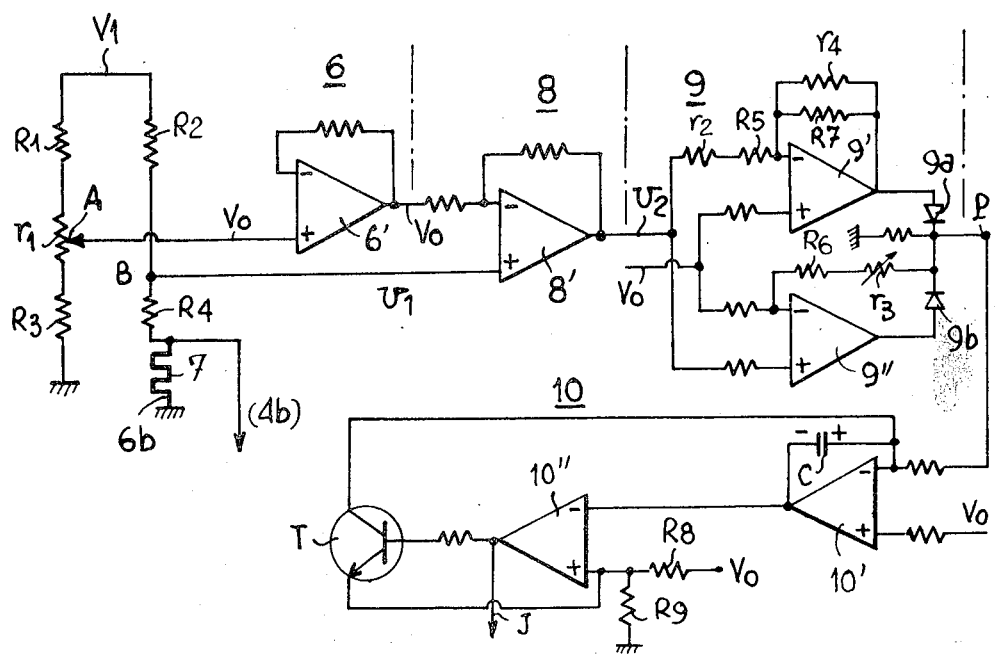
FIG. 2 is a more detailed circuit diagram of part of the circuits shown generally in block form in FIG. 1

In FIG. 2, the input circuit 6 contains the following elements: two voltage dividers forming a bridge, an associated operational amplifier 6', a differential amplifier 8', and two differential amplifiers 9', 9''.

The voltage V1 is supplied to the two voltage dividers one comprising the resistances R1, r1 (potentiometer) and R3, the other comprising the resistances R2, R4 and the shunt 7. On the point A of the slider r1, there exists a voltage V0 which is applied to the positive input of the operational amplifier 6' mounted in complete reverse reaction, with unity gain. At the output there is again found the reference voltage V0, with practically zero internal impedance.

The reference voltage is applied through a resistance to the negative input of the differential amplifier 8' which receives on its positive input the voltage U1 existing at the point B which is the common point between R2 and R4.

The device 9 comprises two differential amplifiers 9' and 9''. The amplifier 9'and 9''. The amplifier 9' receives the voltage V0 through a resistance on its positive input, and voltage U2 on its negative input, through two resistances in series, of which one $r_2$ is variable and the other R5 is fixed. The amplifier 9'' receives the voltage V0 on its negative input through a resistance and U2 on its positive input through a resistance. The point P is common to the output diodes 8a and 8b returns to ground through a resistance. It is also connected to the negative input of the amplifier 9'' by two resistances in series, one of which $r_3$ is variable while the other R6 is fixed.

The gains of the amplifiers 9' and 9'' are approximately equal in amount, for example of the order of −1.7 for 9'' and +1.7 for 9''.

The negative feed-back resistance R7 of the amplifier 9' may have a correction resistance $r_4$ in parallel.

The function of the resistance $r_1$ is to adjust the balance on no-load, that is to say with the meter stopped for a zero current in the shunt 7.

The function of the resistances $r_2$ and $r_3$ is to adjust the metering scale on charge and discharge respectively.

The function of the correction resistance $r_4$ is to reduce the indication of the meter in the case of charging (taking into account the efficiency of the battery).

There is found at the point P a voltage U3 having a fixed polarity irrespective of the direction of the current in the shunt 7.

The impulse generator 10 comprises a first operational amplifier 10', connected to the point P by its negative input through a resistance, and receiving the voltage V0 on its positive input through another resistance. The amplifier 10' is connected as an integrator with a condenser C coupled between the negative input and the output. The output of the integrating amplifier 10' is connected to the negative input of a comparator 10'' which receives on its positive input a voltage of the order of 0.5 V0 reduced from V0 by two resistances R8, R9. The output of the comparator 10'' is connected through a resistance to the base of an NPN transistor T, the emitter of which is connected to the positive input of 10'' and the collector is connected to the negative input of 10'.

By the effect of a voltage U3 applied to the negative input of the amplifier 10', the output voltage, initially equal to V0, decreases in a linear manner. When it reaches the value of the voltage on the negative input (about V0/2), the transistor T which was blocked becomes conductive by the effect of a signal appearing at the output of 10'', and the condenser C is abruptly discharged through the transistor T, which gives rise to an impulse J at the output of 10''.

Figure 3A:
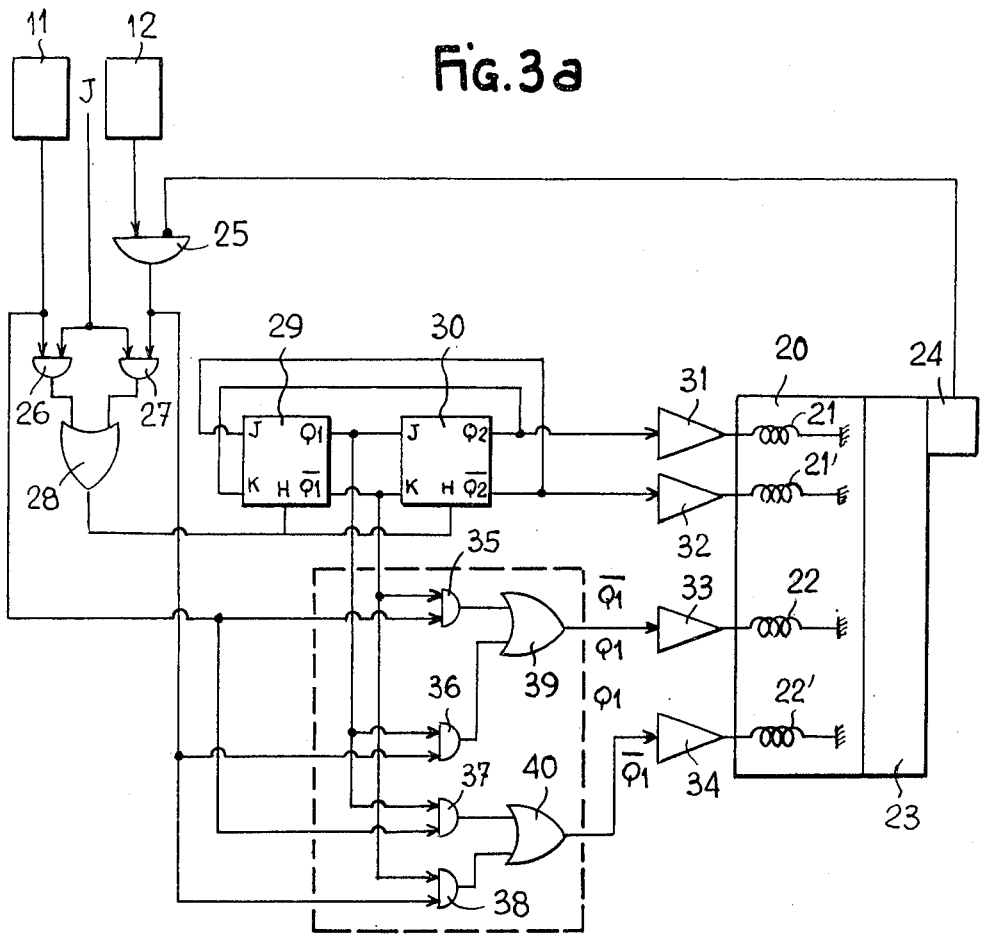
FIG. 3a is a detailed circuit diagram of other parts of the meter.
Figure 3B:
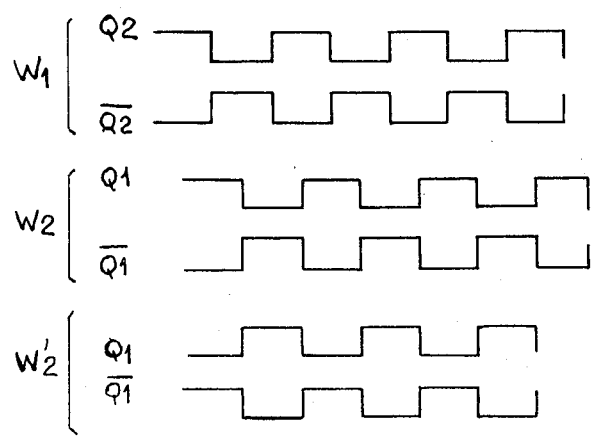

FIGS. 3a and 3b refer to the case in which the metering and indicating device is a step-by-step motor of known type, driving number wheels.

A motor 20 of this kind has two pairs of stator windings, 21, 21' and 22, 22'. It drives an assembly of wheels 23 with numbers. For the zero position of the device 23, a contact 24 sends an inhibiting signal when the battery is fully charged, as has been explained previously.

The logic unit then comprises a first AND gate 25 in series with the threshold device 12 which can receive an inhibiting signal from the device 24, two AND gates 26 and 27 followed by an or circuit 28 for the transmission of the impulses J on the order of the threshold device 11 or the threshold device 12.

For rotation in one direction, the windings 21, 21' must receive two additional first square waves, and the windings 22, 22' must receive the second additional square waves which are phase-displaced by $\pi/2$ with respect to the the first square waves. For rotation in the opposite direction, the windings 21, 21' receive the same additional first square waves and the windings 22, 22' receive the additional square waves phase-displaced by $\pi/2$ but in a position reversed with respect to the first direction.

These square waves are advantageously obtained by means of two bi-stable trigger circuits 29, 30 of the JK type connected up as a ring counter which receive on their clock terminals H the impulses delivered from the OR circuit 28.

The additional square waves coming from the outputs Q2, $\overline{Q2}$ of the trigger circuit 30, amplified by two amplifiers 31, 32 respectively, are applied to the windings 21, 21'. The additional square waves coming from the outputs Q1, $\overline{Q1}$ of the trigger circuit 29 are applied to two amplifiers 33, 34, supplying the windings 22, 22' respectively through a reversing device formed by four AND gates, 35, 36, 37 and 38, and two OR circuits 39 and 40. Under the control of the threshold device 11, the amplifier 33 is connected to the output $\overline{Q1}$ and the amplifier 34 is connected to the output Q1; under the control of the threshold device 12 the amplifier 33 is connected to the output Q1 and 34 is connected to the output $\overline{Q1}$.

FIG. 3b shows the relation between the waves W1 (windings 21, 21') and the waves W2 (windings 22, 22', first direction of rotation) and the waves W'2 (windings 22, 22', opposite direction of rotation).

The apparatus according to the invention has been described with a single supply system. However, within the scope of the invention, the supply system could be differently arranged, for example with two separate supply systems.

What we claim is:

1. An electricity meter for an accumulator battery having an adding direction of operation corresponding to charging current flowing into the battery and a deducting direction of operation corresponding to discharging current flowing out of the battery comprising: a shunt, an amplification circuit connected to said shunt, an impulse generator connected to said amplification circuit for generating impulses having a frequency proportional to the current intensity on discharge or charge passing through said shunt, a device for counting and indicating the counted number of impulses, and threshold means and logic means coacting together for enabling the counting of said impulses in the adding direction only when the discharge current has an absolute value greater than a first pre-determined threshold value and enabling the counting of said impulses in the deducting direction only when the charging current has an absolute value greater than a second pre-determined threshold value, a rectifier circuit connected between said impulse generator and amplification circuit and supplying at its output a voltage having the same polarity irrespective of the direction of the current in said shunt, an input circuit connected to the input of said amplification circuit and comprising two voltage dividers supplied with a stabilized voltage derived from said accumulator battery, a tapping on one of said voltage dividers being connected to an amplifier for producing a reference voltage under practically zero impedance, and the other of said voltage dividers having two arms in the lower arm of which is inserted said shunt.

2. An electricity meter as claimed in claim 1, in which said one voltage divider includes a resistance for regulating the zero setting of said meter, said resistance being connected to the stabilized voltage source.

3. An electricity meter for an accumulator battery having an adding direction of operation corresponding to charging current flowing into the battery and a deducting direction of operation corresponding to discharging current flowing out of the battery comprising: a shunt, an amplification circuit connected to said shunt, an impulse generator connected to said amplification circuit for generating impulses having a frequency proportional to the current intensity on discharge or charge passing through said shunt, a device for counting and indicating the counted number of impulses, and threshold means and logic means coacting together for enabling the counting of said impulses in the adding direction only when the discharge current has an absolute value greater than a first pre-determined threshold value and enabling the counting of said impulses in the deducting direction only when the charging current has an absolute value greater than a second pre-determined threshold value, said device for counting and indicating comprises a device of the electronic type having an input receptive of impulses for the forward counting direction and an input receptive of impulses for the deduction direction, wherein said threshold means and logic means comprises two AND gates connected to two threshold devices giving said first and second threshold values, said threshold devices being coupled to each of said inputs respectively, and an AND gate serving as an inhibitor in cooperation with a decoding device for the zero condition of said counting and indicating device.

* * * * *

UNITED STATES PATENT AND TRADEMARK OFFICE
CERTIFICATE OF CORRECTION

PATENT NO. : 3,898,548
DATED : August 5, 1975
INVENTOR(S) : Michel Perelle and Paul Schott It is certified that error appears in the above—identified patent and that said Letters Patent are hereby corrected as shown below:

Column 2, line 18, "disturbanc" should be <u>disturbance</u>.

Line 22, after "whereby" add <u>it</u>.

Line 52, delete [value].

Column 3, line 11, delete [earth] and insert <u>ground</u>.

Line 56, delete [input].

Column 4, line 8, change "rl" to $\underline{r_1}$.

Line 10, change "rl" to $\underline{r_1}$.

Line 22, delete [The amplifier 9' and 9".]

Column 5, line 20, change "or" to <u>OR</u>.

Signed and Sealed this twenty-fifth Day of November 1975

[SEAL]

*Attest:*

RUTH C. MASON
*Attesting Officer*

C. MARSHALL DANN
*Commissioner of Patents and Trademarks*